United States Patent [19]
Bonzak

[11] Patent Number: 5,199,169
[45] Date of Patent: Apr. 6, 1993

[54] METHODS OF MAKING RECIRCULATING BALL NUT AND SPLINED SHAFT AND SCREW ASSEMBLIES

[75] Inventor: Michael J. Bonzak, Bay City, Mich.

[73] Assignee: Thomson Saginaw Ball Screw Company, Inc., Saginaw, Mich.

[21] Appl. No.: 812,747

[22] Filed: Dec. 23, 1991

[51] Int. Cl.$^5$ ............................................. F16C 43/00
[52] U.S. Cl. ................................. 29/898.07; 29/458; 29/898.03; 74/424.8 R
[58] Field of Search ............ 29/898.03, 898.07, 402.18, 29/458, 527.1, 527.2, DIG. 1; 74/424.8 R, 89.15, 459

[56] References Cited

U.S. PATENT DOCUMENTS

| | | | |
|---|---|---|---|
| 3,029,660 | 4/1962 | Sears | 74/424.8 R |
| 3,171,296 | 3/1965 | Chemel | 74/424.8 R |
| 3,546,930 | 11/1968 | Flarsheim | 74/459 |
| 3,656,358 | 4/1972 | Kopp | 74/89.15 |
| 4,637,272 | 1/1987 | Teske et al. | 74/424.8 R |
| 4,671,325 | 6/1987 | Otter | 138/30 |
| 4,905,533 | 3/1990 | Benton et al. | 74/459 |
| 4,938,090 | 7/1990 | Brusasco | 74/424.8 R |
| 5,104,005 | 4/1992 | Schneider, Jr. et al. | 74/424.8 R |

FOREIGN PATENT DOCUMENTS 671403 10/1963 Canada.

*Primary Examiner*—Mark Rosenbaum
*Assistant Examiner*—S. Thomas Hughes
*Attorney, Agent, or Firm*—Learman & McCulloch

[57] ABSTRACT

A method of making recirculating ball nut and threaded shaft, and race and splined shaft assemblies comprising, cutting the grooved shaft to desired length, relatively moving the shaft and ball nut or race to cause the nut or race to move over the end of the shaft and axially along it to a location removed from the terminal end of the shaft, selecting a pre-machined shaft end component having an external bearing surface of the required size for the diameter and length of shaft which has been cut, and having a sleeve with internal groove and land portions complemental to the groove and land portions of the shaft, coating at least one of the grooved portions of the pre-machined shaft end component and the one end of the shaft with a hardenable adhesive, relatively moving the pre-machined shaft end component and shaft to cause the sleeve to move over the terminal end of the shaft and axially along the shaft to dispose the pre-machined end component on the shaft with its sleeve covering the adhesive, and curing the adhesive to form an integrated axially extending key between the pre-machined shaft end component and shaft. The invention is further concerned with the product so formed.

6 Claims, 1 Drawing Sheet

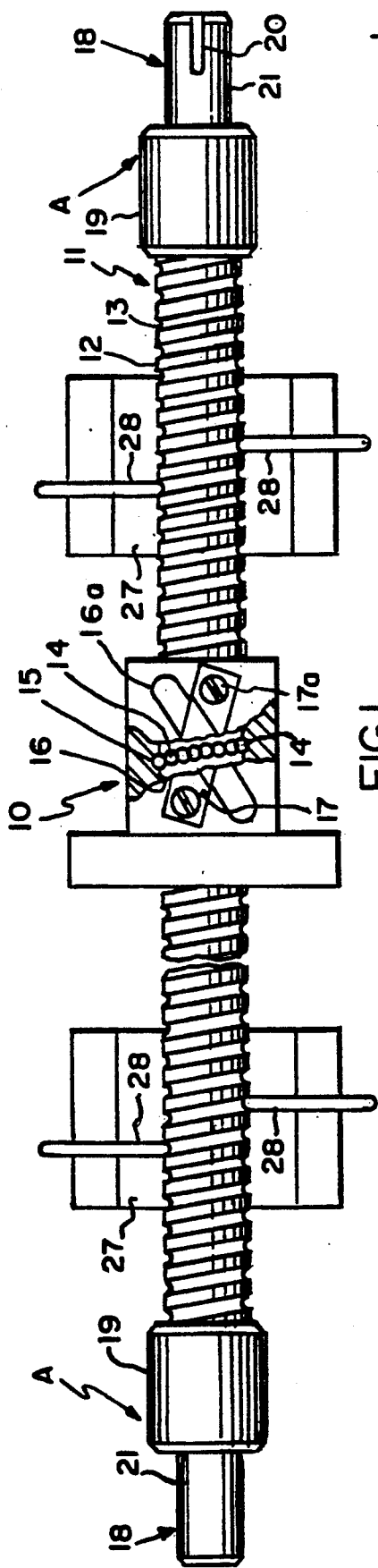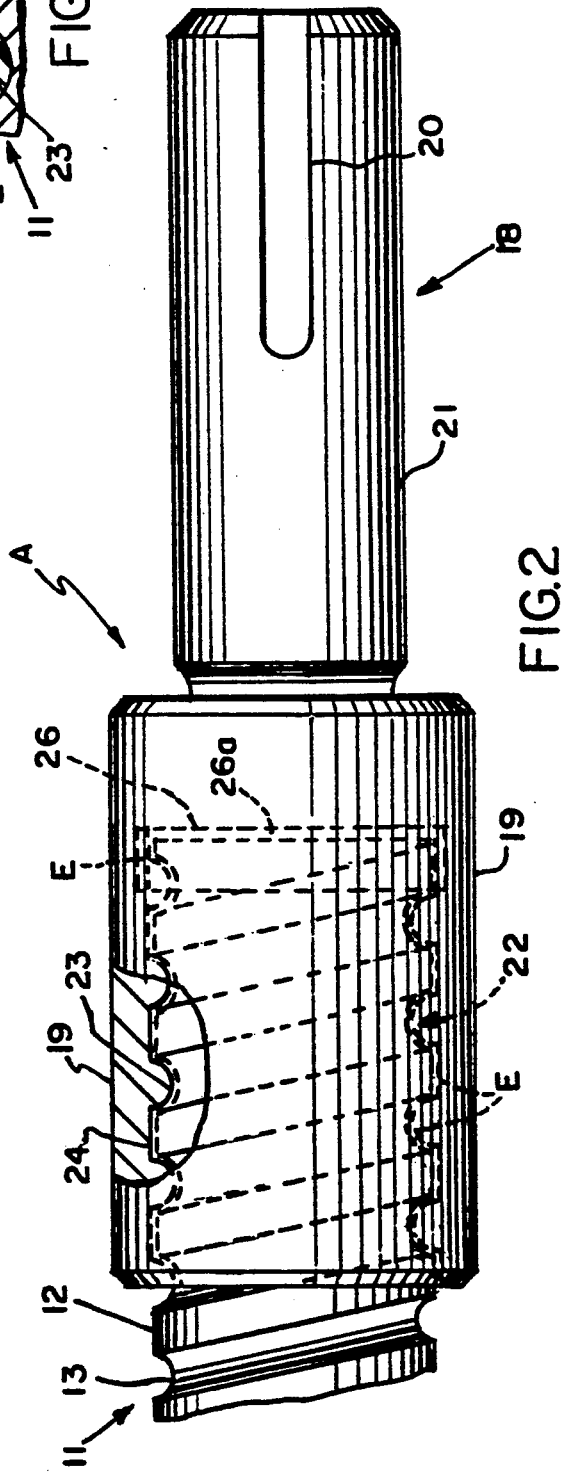

METHODS OF MAKING RECIRCULATING BALL NUT AND SPLINED SHAFT AND SCREW ASSEMBLIES

BACKGROUND OF THE INVENTION

This invention relates to recirculating ball nut and screw or splined shaft assemblies which comprise an externally grooved, ball-accommodating shaft with a complementally internally grooved nut having a circuit for precision bearing balls which recirculate in the grooved parts. More particularly, it is concerned with methods of providing bearing ends for the shafts of such assemblies, with some of the bearing ends incorporating a drive attachment or coupling configuration. The invention is further concerned with the products formed by practicing the method.

Previously, bearing surfaces and drive configuration surfaces of the required diameter and type have been machined on demand, and to specification, on the ends of the grooved shaft at the time of machining the shaft in the factory, and the assemblies have been then marketed in finished form. Some time has been required to prepare the drawings or specifications necessary to place such orders, schedule them in the factory for production, produce them, and ship them.

One of the prime objects of the present invention is to provide a method which permits the customer, or the customer's assembler, to more quickly provide the required end configurations for various diameter grooved shafts of the desired length. The concept envisions the production of pre-machined ends at the factory in a variety of standard sizes and configurations which can be inventoried and ordered to suit the particular length of grooved shaft to be used with a given ball nut. The method of fabricating to b described dramatically shortens the time required for the production of a recirculating ball nut and screw assembly from days to hours.

Still another object of the invention is to provide a method of making a ball nut and screw assembly, having finish-machined driver or bearing ends of the required size and configuration, which can be performed by customers with no access to precision turning or grinding machinery to provide the particular shaft ends which are required for a particular ball nut and screw assembly to function.

A further object of the invention is to provide a very economical method of fabricating ball nut and screw or splined shaft assemblies which can be performed on site by relatively unskilled work crews using only very simple and readily available hardware.

Still another object of the invention is to provide a method for forming a recirculating ball nut and screw or splined shaft assembly of the character described which provides an assembly with the required precision without undue expense and with reliability.

A still further object of the invention is to provide an assembly of the character defined which operates with efficiency, and which has a predictable service life and requires little or no maintenance.

Applicant is aware of the following listed patents which applicant incorporates herein by reference but points out that none of them, either alone or in combination, suggest the novel method and product which applicant has claimed.

U.S. Pat. No. 3,546,930, Flarsheim
U.S. Pat. No. 3,656,358, Kopp
U.S. Pat. No. 4,905,533, Benton et al
U.S. Pat. No. 4,938,090, Brusasco
Canadian 671,403

None of these patents suggest the pre-machining of separate attachment end components in standard configurations to provide the external bearing surfaces and drive attachment configurations which particular size ball screws require for the functions to be performed and the loads which they are to bear.

Other objects and advantages of the invention will be pointed out specifically or will become apparent from the following description when it is considered in conjunction with the appended claims and the accompanying drawings.

THE DRAWINGS

In the drawings,

FIG. 1 is a schematic top plan view of a completed ball nut and screw assembly, showing it supported in the position in which an adhesive curing step can be performed, the nut being partly broken away to show the high precision bearing balls which recirculate in the nut.

FIG. 2 is a enlarged, fragmentary elevational view of one of the pre-machined attachment end components, the inboard portion of the end being partly broken away to illustrate the hardened adhesive key which is formed during the processing steps.

FIG. 3 is a still more enlarged, fragmentary view.

DETAILED DESCRIPTION

Referring now more particularly to the accompanying drawings, and in the first instance to FIG. 1, I have illustrated a ball nut, generally designated 10, mounted on a screw generally designated 11. The screw 11 is shown as having a continuous helical thread or land portion 12 bounded by a continuous helical groove 13 of semi-circular cross-section to provide a raceway for the balls 14 which permit relative rotation and translation of the nut 10 and screw 11. The ball nut 10 has a mating or complemental internal helical groove 15 of the same cross section and size, bounded by a helical land or thread 16 in the usual manner, and a ball return tube 16a which spans a number of turns of the helical groove 15 provides for ball recirculation. A clamp plate 17, secured by fasteners 17a, may be utilized to secure the ball return tube in position.

Provided at each end of the screw 11, is an initially separate, attachment end component, generally designated A, which may take any one of a number of standard configurations. As shown in FIG. 1, the attachment end A at the right end of the screw 11 comprises an outboard solid shaft end, generally designated 18, extending integrally from a sleeve 19. The outboard end 18 typically may have an axially extending slot or drive attachment configuration 20, permitting it to be coupled to an electric motor shaft (not shown) for driving the screw 11 in rotation. When this type of coupling configuration 20 is provided and the shaft 11 is driven, the nut 10 will be prevented from rotating with it and instead will be translated back and forth on the shaft 11 in the usual manner. The shaft 11, nut 10, and end components A are shown as formed of steel, as usual, to take the loads required.

Inboard of the coupling configuration 20 is a bearing surface 21 having a predetermined length and diameter. Internally, the sleeve 19 is provided with an internally threaded surface, generally designated 22, which comprises a continuous helical groove 23 separated by a continuous helical thread or land 24. The groove and land configuration 23-24 is identical to the groove and land configuration 12-13 of the screw 11, and provides a clearance generally designated 25 between the groove and land 12-13 of the screw 11 and the sleeve groove and land 23-24 as will be described. Provided to fill clearance 25, is a hardened, cured epoxy key E of helical configuration which both adhesively and mechanically joins each pre-machined end A to the shaft 11.

THE METHOD OF FORMING

Assuming that the customer, at his place of business, has purchased a standard ball nut 10 and screw 11, and has obtained ends A from a stock of pre-machined ends of various standard sizes and configurations to produce a ball nut and screw assembly without ordering it as an assembled unit from the factory, it is merely necessary that the customer first cut the shaft to a desired length which considers the particular application and the loads which will be borne by the assembly. Thereafter, the nut 10 is threaded onto the end of shaft 11 until it reaches an interjacent position removed from the terminal ends of the shaft. Finally, the threads and lands 23-24 and the end cavity 26 are coated with a hardenable adhesive such as a liquefied epoxy resin E of the type described in U.S. Pat. Nos. 4,643,041 and 4,272,476. Epoxy resins are discussed in U.S. Pat. No. 4,017,453 and all of these patents are incorporated herein by reference. At the same time, the terminal ends of the screw 11 have their end faces, and lands and grooves 12-13, coated with the hardenable adhesive over the length of the screw ends which will be received by the sleeve portions 19. Before the adhesive sets, the attachment ends A are screwed onto the terminal ends of the screw shaft 11 to seat them in place in the manner indicated in FIGS. 1 and 2. Thereafter the screw shaft may be placed in V-blocks 27 which each have projecting pins 28 for engagement at spaced apart intervals with portions of the groove 13. It is in this manner that the epoxy E is cured, while the assembly is supported by the pins 28. While I have indicated that an epoxy adhesive may be used, other hardenable high strength adhesives may be used. The epoxy E or other high strength adhesive is applied such that all clearances, including end clearances 26a, are completely filled and a circumferential key extending from an end wall is formed when the epoxy cures or hardens.

Once the assembly is supported in the blocks 27, dial indicators can be used to check the outer diameters of the ends A relative to the ball circle diameter of the screw 11 for concentricity. If adjustment is required, the ends A can be repositioned as necessary by a light blow from a hammer, before the epoxy or other adhesive has fully set. Typically, the epoxy or other adhesive will cure at room temperature within one to two hours, depending on the particular adhesive used. If higher strength is required, the attachments A can also be drilled and pinned for added strength and higher torque applications, once the adhesive resin has fully cured.

While I have illustrated a ball screw and nut race device assembly in the drawings, it should be clear that I could also fashion a splined shaft assembly with a recirculating ball race device for splined shafts in the same way. Instead of providing a helical raceway, ball race devices for splined shafts commonly utilize end connected radially inner and outer linear races.

Although preferred embodiments of the invention have been illustrated in the accompanying drawings and described in the foregoing detailed description, it will be understood that the invention is not limited to the embodiments disclosed, but is capable of numerous rearrangements, modifications and substitutions of parts and elements without departing from the spirit of the invention which is defined in the following claims.

What is claimed is:

1. A method of making recirculating ball race device and ball screw shaft assemblies of the character wherein the ball race device has internal ball receiving groove portions and land portions and incorporates a recirculating ball circuit having load-bearing balls therein, and the screw shaft has complemental ball groove and land portions for cooperatively receiving the balls, comprising the steps of:

(a) cutting the screw shaft to a desired length which leaves at least one end with an externally grooved and landed portion extending to a terminal end of the screw shaft;

(b) relatively moving the screw shaft and the recirculating ball race device with balls incorporated in its groove portions to cause the race device to move over said end of the screw shaft and axially along it to a location removed from said end of the screw shaft, with the race balls received in the grooved portions of the screw shaft as the race device moves along the screw shaft and radially separating the race device and screw shaft.

(c) selecting a pre-machined shaft end component comprising a sleeve with an open end and an opposite end with an internal end wall surface, the sleeve opposite end having a projecting section with an external pre-machined cylindrical bearing surface thereon of a size required for rotatably supporting the said end of the screw shaft for the diameter and length of screw shaft which has been cut, the sleeve further having internal groove and land portions, which complement the ball-accommodating external groove and land portions of the screw shaft, but leave a clearance therebetween, and coating at least one of said grooved portions of the pre-machined shaft end component and said one end of the screw shaft with a hardenable adhesive;

(d) relatively axially moving the pre-machined shaft end component and screw shaft to cause the pre-machined shaft end component sleeve to move interactively over said terminal end of the screw shaft and axially along the screw shaft to dispose the internal wall surface of said end of the sleeve of the pre-machined end component on the screw shaft, with said internal wall surface radially opposite the terminal end of the screw shaft, to dispose the adhesive radially between the sleeve and screw shaft; and (e) hardening the adhesive between the sleeve of the pre-machined shaft end component and said screw shaft to form an integrated axially extending adhesive key between the pre-machined shaft end component and screw shaft.

2. The method of claim 1 wherein the groove and land portions on said screw shaft, and within said sleeve, are helically disposed and said race device is a nut, and wherein the relatively moving steps (b) and (d) comprise screwing said nut and pre-machined shaft end component onto said screw shaft.

3. The method of claim 1 wherein said relative axial movement of the shaft end component and screw shaft is halted to leave a lateral clearance within said sleeve portion of the pre-machined shaft end component internal wall surface and the terminal end wall of said screw shaft, and the method includes the step of filling said lateral clearance prior to step (e) with a hardenable adhesive to integrally unite said internal wall surface with said screw shaft terminal end.

4. The method of claim 2 including supporting said screw shaft for step (e) by lowering it to V-blocks with projecting pins which are received in said helical groove portions in the screw shaft at spaced intervals.

5. The method of claim 1 wherein a second pre-machined shaft end component having an external pre-machined bearing surface and external drive attachment configuration, has a sleeve portion with internal groove and land portions complemental to the groove and land portions of said screw shaft, the sleeve portion on said second pre-machined end component having one open end and one end providing an internal end wall surface, the opposite terminal end of said screw shaft has its groove and land portions extending to the end wall of its opposite terminal end, coating said groove and land portions of the opposite terminal end of said screw shaft with a hardenable adhesive, moving the said second pre-machined shaft end component and screw shaft relatively to cause the second pre-machined shaft end component sleeve portion to move over said opposite terminal end of the screw shaft and interactively axially along it over the groove and land portions of the screw shaft which have been coated with adhesive only to an extent to leave a lateral clearance between the said internal wall of the sleeve portion of the second pre-machined shaft end component and the terminal end of said opposite shaft end, and hardening the adhesive.

6. The method of claim 5 including coating a hardenable adhesive on said internal wall of the sleeve portion of the second pre-machined shaft end component and externally on the said opposite terminal end of the screw shaft to an extent to fill the said clearance at said opposite end of the screw shaft, and hardening the adhesive within said lateral clearance at said opposite end of the screw shaft.

* * * * *